June 13, 1933. T. H. BEAN 1,914,098
MATERIAL HANDLING APPARATUS
Filed March 12, 1931 2 Sheets-Sheet 1

INVENTOR
T. H. BEAN
BY
E. R. Nowlan
ATTORNEY

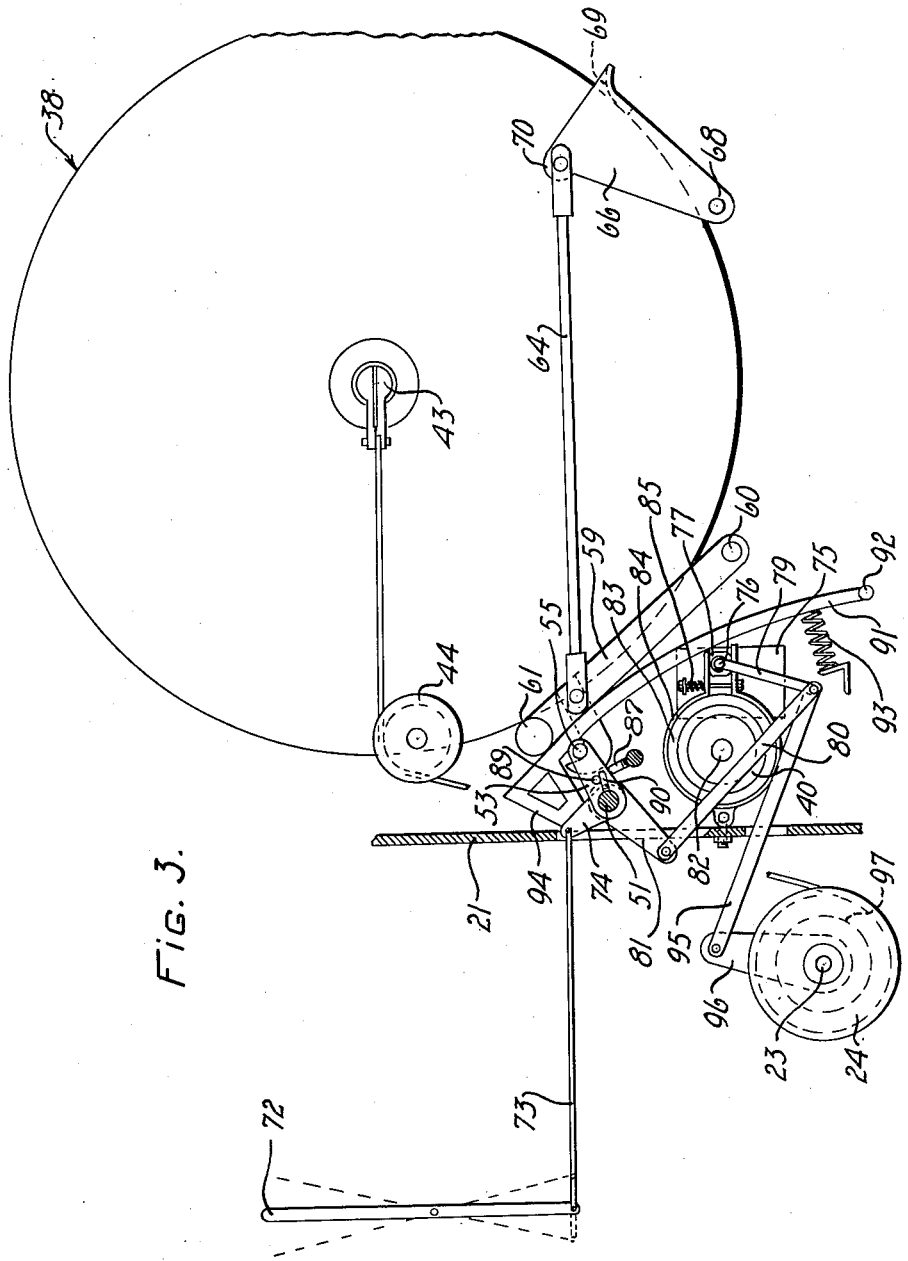

Patented June 13, 1933

1,914,098

UNITED STATES PATENT OFFICE

TILFORD H. BEAN, OF IRVINGTON, NEW JERSEY, ASSIGNOR TO WESTERN ELECTRIC COMPANY, INCORPORATED, OF NEW YORK, N. Y., A CORPORATION OF NEW YORK

MATERIAL HANDLING APPARATUS

Application filed March 12, 1931. Serial No. 521,977.

This invention relates to material handling apparatus and more particularly to driven trucks for handling cylindrical objects.

An object of the invention is to provide a material handling apparatus capable of expeditiously loading, transporting and unloading the material.

In accordance with one embodiment of the invention, a telephone cable reel is held in position upon an industrial truck by a tiltable gate member which is locked in position when the reel assumes its proper position on the truck. Specifically, a transversely extending pipe carried in a rotatable lever connected to the gate is engaged by the reel as it is hauled upon the truck and carried forward into engagement with a locking rod, the power for hauling the reel being simultaneously cut off. In discharging the reel the locking rod is disengaged from the latch by a switch operative from the control end of the truck. The gate is lowered and the reel permitted to roll off the truck.

Other features and advantages of the invention will become more apparent from the following detailed description taken in conjunction with the accompanying drawings forming a part thereof, in which Fig. 1 is a fragmentary plan view of a truck embodying the invention;

Fig. 3 is a schematic enlargement in elevation of the driving and control mechanism.

Figure 1:
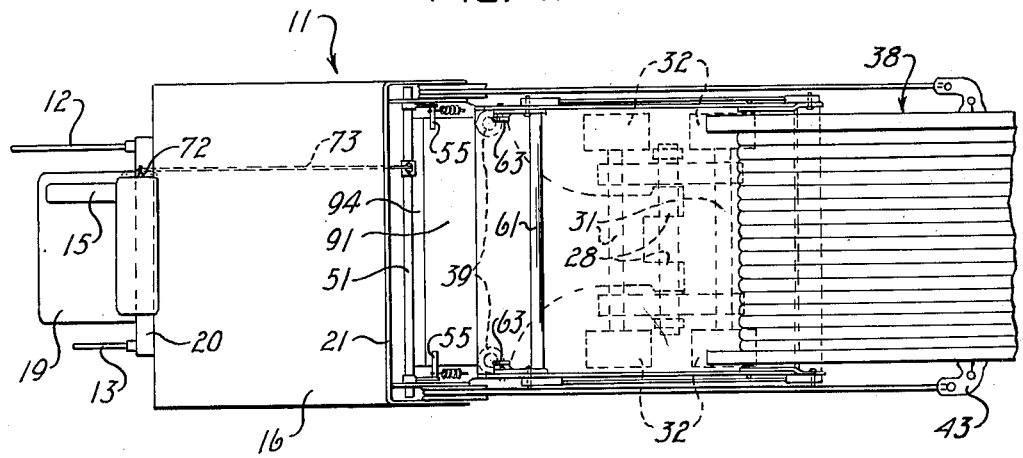

Referring now to the drawings wherein like reference characters designate same parts throughout the views, an electrical industrial truck, generally designated by the numeral 11, is provided with the usual steering lever 12, a drive controlling lever 13, a brake controlling treadle 15 and a housing 16 under which is mounted a driving motor and its cooperating gearing and electrical storage batteries for supplying energy to the motor. For the sake of clearness and since they do not form a part of the present invention, the details of the aforementioned parts have not been shown.

The batteries and motor with its cooperating parts mounted under the housing 16 furnish power to drive oppositely disposed wheels 17 and may be controlled through the lever 13 by an operator standing on a platform 19 suspended from the housing 16 by a vertically disposed member 20. A U-shaped shield member 21 is attached to the other end of the housing 16 and has a shaft 23 journalled in the lower ends of the arms on which a pair of oppositely disposed drums 24—24 is mounted. An irregularly shaped and horizontally disposed supporting frame 25 is attached to the lower end of the U-shaped member 21 and extends longitudinally of the truck 11. In this description, that shown at the right hand side of Figs. 1 and 2 will be referred to as the front or reel carrying end of the truck, and that shown at the left hand side of the sheet will be referred to as the rear or control end of the truck.

An equalizing axle 27 is journalled in bearings 28—28 formed in the right end (Fig. 1) of the member 25 and has a pair of V-shaped members 29 mounted thereon. The ends of the V-shaped members 29, away from the apex thereof, have a pair of axles 31—31 mounted therein to the ends of which are pivotally mounted in any well known manner four trailer wheels 32—32. A platform 35 is fulcrumed about the equalizing axles 27 at the ends thereof by means of depending portions 36—36 formed integral with the platform 35. The platform 35 has flanges 37—37 formed on the sides thereof to assist in maintaining a telephone cable reel designated generally by the numeral 38 in position thereon and is at its left hand end (Figs. 1 and 2) normally, resiliently supported by means of a pair of coiled springs 39—39 interposed between the lower surface of the platform 35 and the irregular shaped member 25.

An electric motor 40 within the housing is connected by any suitable approximately one hundred to one gear reducing mechanism (not shown) to drive the shaft 23, upon which the drums 24—24 are mounted, to actuate a pair of cables or chains 43—43 or other suitable flexible members, each of which has an end thereof secured to one of the drums 24—24. The cables 43—43 which are designed to be wound around and unwound from the drums 24—24 pass over sheaves 44—44 pivoted about pins 45—45 which are secured in the upper end of the member 21 at opposite sides thereof.

The reel 38 is of the conventional cable carrying type comprising a pair of circular interconnected heads 46—46 disposed one at each end thereof; and each head is provided with an axial aperture 47. By means of a pin, clevis or other suitable attaching means 48 a reel center plug 49, which may be of any suitable type, but preferably of the kind described and claimed in the application of William Schroeder, Serial No. 420,063, filed January 11, 1930, is attached to the free end of each cable 43. It will be understood that when the plug 49 is placed in the aperture 47 of the reel head, the reel may be caused to travel toward or away from the U-shaped member 21 by varying the tension in said cables.

A shaft 51 extending from side to side of the truck is pivotally mounted at each end in the U-shaped member 21 and has rotatably mounted thereon at each end a latch member 53 which latter operate in unison. At the extremity of the latch member 53 a horizontally extending rod 55 is provided. Each latch member 53 is rotatably mounted on the shaft 51, being normally held in the position shown in full lines (Fig. 2) by means of a tension spring 56, which is secured to the rod 55 and to the framework of the truck at 57, or by gravity. An upwardly extending lever 59 is pivotally mounted in the flanges 37 of the tiltable platform 35 at each side thereof, the two levers 59 being connected by a straight pipe 61 extending across the truck.

Secured at the upper extremity of each lever 59 is a hook member 63 which is secured thereto to project toward the adjacent rod 55. An elongated rod or link 64 is pivotally secured to the upper end of each latch member 59 and extends toward the front end of the truck. A tiltable gate or chock consisting of a floor 65 and oppositely disposed upturned side flanges 66—66 is pivotally secured at an inner end 68 thereof to the upturned flanges 37—37 of the platform 35 near the forward end thereof. The outer end 69 of the chock is curved downwardly so as, when in the position shown in full lines in Fig. 2, to provide an inclined surface to facilitate movement of the reel 38 with respect to the truck. Above the outer end 69 the chock or shelf is provided at each flange with an ear 70 in which the outer end of each link 64 is pivotally secured. A switch handle 72 is pivotally mounted to the upright member 20 at the control end of the truck, being provided at the lower extremity thereof with a link 73 which is affixed to an arm 74 secured to the shaft 51.

Since the considerable power necessary to hoist and control the lowering of the reel 38 with reference to the truck is delivered from the motor 40, which incidentally may be small and of low power, located within the housing and therefore necessarily remote from the control or platform end of the truck, efficient and safe operation of the truck is facilitated when provision is made for the control of the hoisting apparatus from the platform 19. To this end a limit switch 75 (Fig. 3) positioned adjacent the motor 40 within the housing is provided, which limit switch may be of any conventional type operated through a horizontal rotatable rod 76 which extends therethrough. In order, however, to additionally and mechanically limit the operation of the hoisting apparatus, a block 77 of rectangular cross-section is secured to the horizontally extending rod 76. Secured to the opposite end of the rod 76 is a toggle arm 79 which is pivotally connected to one end of a link 80 the opposite end of which is pivotally connected to an arm 81 secured on the shaft 51. Secured on a drive shaft 82 of the motor 40 is a brake drum 83 of any conventional design which rotates between and is subject to control by a pair of cooperating brake bands 84 which are mounted on the housing of the truck in any suitable manner and normally urged together by a spring 85.

Figure 2:
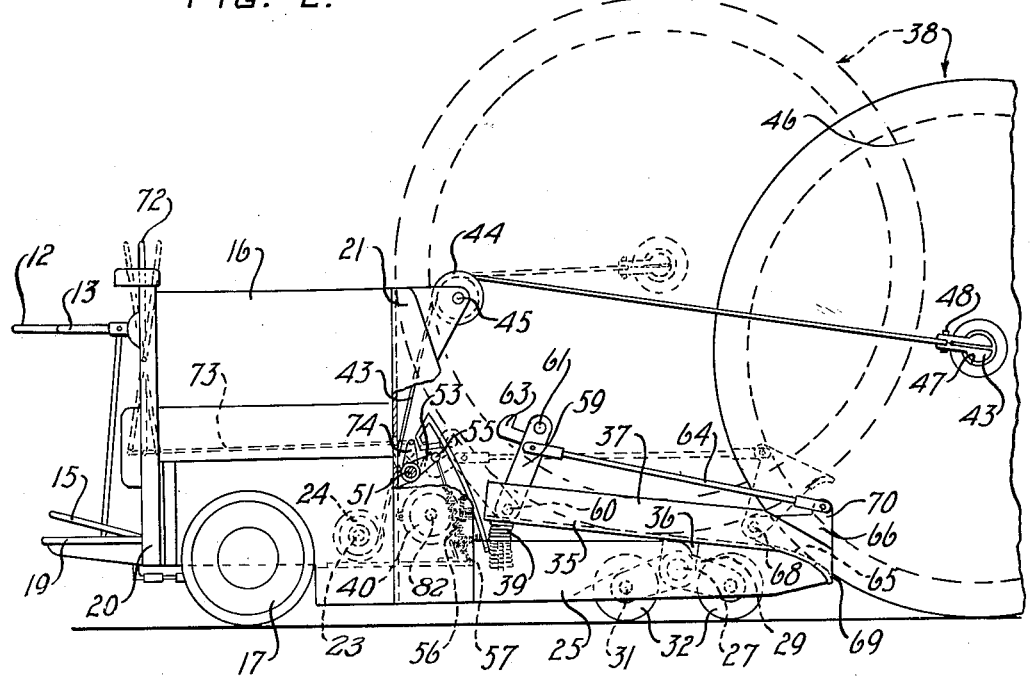
Fig. 2 is an elevational view of the truck.

The arm 53, being rotatable about the shaft 51 and located to the right thereof as shown in Fig. 3, normally tends by gravity and the spring 56, to rotate downwardly in a clockwise direction. A support 87 secured to the housing and projected under the arm 53, however, prevents the arm from falling lower than that position shown in full lines (Figs. 2 and 3). In order to permit the arm 53 to be raised for purposes to be hereinafter explained, it is provided on one side thereof with a projection or a lug 89, which is adapted to be engaged by a set screw 90 projecting from the shaft 51 thereunder, as best shown in Fig. 3. An apron 91 pivoted at 92 in the platform 35 extends upwardly at an incline toward the U-shaped member 21 between the latter and the cross pipe 61. A compression spring 93 (Fig. 3) couched against the apron 91 serves to urge it toward the pipe 61 and to a vertical position. An angular projection 94 on the rear side of the apron assists in controlling the hoisting apparatus in a manner to be explained below. One end of a link 95 is pivotally secured to the end of the toggle arm 79 bearing the link 80 and the opposite end thereof is pivotally secured to a rotatable arm 96 which constitutes an end member or a progressive ring hoisting controller 97 of any well known type which is mounted on the shaft 23 between the oppositely disposed hoisting drums 24—24.

It is believed that a clearer understanding of the mechanism to which this application is drawn will be afforded by the following description of the operation thereof. In loading the telephone cable reel 38 onto the platform 35 of the truck, the truck is maneuvered initially into a position substantially in alignment with the heads 46 of the cable reel 38. The reel center plugs 49 are then inserted in the apertures 47 in the heads and the motor 40 is started by pulling the switch handle 72 from the neutral position shown in full lines to the left to the position shown in dotted lines. This moves the link 73 to the right, rotating arm 74, shaft 51 and arm 81 in a clockwise direction and moving arms 80 and 79 to rotate brake block 77 and shaft 76 in a clockwise direction to release the brake drum 83 and start the motor 40 respectively. Shaft 23 and drums 24—24 are driven through the reducing gears and rotated in a clockwise direction, the cables being drawn over the sheaves 44—44 to hoist the reel onto the truck.

As soon as the edges of the reel head 46 strike the platform 35 the platform will be rocked about the equalizing axle 27 in a clockwise direction until the forward edge of the platform and the stop gate 65 touch the floor, thus materially reducing the amount of power required to move the reel 38. The reel 38 will thus be drawn onto the platform 35 and moved therealong toward the control end thereof, advancing from the position shown in full lines (Fig. 2) to that shown in dotted lines until the center of gravity thereof passes over the equalizing axle 27. The platform is then rocked in the counter-clockwise direction and into engagement with the springs 39, thus lifting the forward end off the floor and resiliently supporting the left end thereof during transportation of the reel. During this movement the locking lever 59 retains substantially that position shown in full lines in Fig. 2. The reel is drawn further to the left by the cables 43, the edges of the heads thereof coming in contact with the pipe 61. As the reel continues to advance the lock lever 59 is carried toward the control end of the truck likewise, and when the reel comes to the desired position for carrying shown in dotted lines (Fig. 2) the pipe 61 engages the apron 91 to press it against the tension of the spring 93, causing the projection 94 to press against the pivotally connected ends of link 73 and arm 74.

The two latter members are moved thereby to the left, shaft 51, and arms 74 and 81 being rotated in a counter-clockwise direction. The brake block 77 and limit switch rod 76 are simultaneously rotated in a counterclockwise direction to permit the spring 85 to press the brake bands into engagement with the drum and stopping the motor 40 respectively. Simultaneously therewith, the lock lever 59 is carried to the left by the pipe 61, the leftward edge of the hook 63 passing under and lifting the rod 55 on the rotatable arm 53; the rod 55 drops in to locking position in the notch of hook 63. Under these conditions it will be observed that the stop shelf 65 is lifted to almost a vertical position around the pivot 68 and extends upwardly against the reel periphery. The latch being hooked against the rod 55, the stop shelf is locked against the reel and the latter securely held upon the platform without it being necessary to maintain any tension in the cables 43—43.

In this connection it will be understood that the cables 43—43 are of equal lengths, and the progressive regulator 97 of the drums is so set that the arm 96 is moved through a short arc when the shaft 23 has been rotated a sufficient number of times in either direction from the motor 40 to entirely pay out or coil on the cable. This movement is transmitted through the link 95 to the toggle arm 79 to provide an additional and mechanical limiting control for the motor 40 and the brake drum.

In this condition it will be noted that the upper extremity of the switch or control handle 72 is thrown to the neutral position. The reel 38 is then transported to the desired location.

When it is desired to unload the reel, the upper end of the switch handle 72 is moved to the extreme right, as shown in dotted lines in Fig. 2, thus causing the link 73 to be pulled to the left rotating shaft 51 and set screw 90 in a counter-clockwise direction, the latter engaging the lug 89 and lifting latch rods 55 out of the hook 59. Simultaneously, the arm 81 is rotated in a counter-clockwise direction, moving the link 80 to the right and rotating the brake block 77 and limit switch rod 76 in a counter-clockwise direction to release the brake drum 83 and start the motor 40 in a reverse direction respectively to pay out the cables and lower the reel. The latch lever 59 and associated parts assume the positions shown in full lines in Fig. 2 and the reel is rolled to the ground. The reel center plugs may then be removed from the apertures 47 and the truck dispatched for another load.

If desired, in order to accommodate reels of various width, the sheaves 44—44 over which the cables 43—43 pass may be pivoted about a vertical axis so as to allow the cables to pass angularly to the center of any reel whose width does not exceed the distance between the inside edges of the flanges 66—66 of the stop shelf.

By utilizing the apparatus described above as in the manner indicated, telephone cable reels or other objects may be expeditiously loaded, transported and unloaded with absolute safety to operatives and without fear of damage to the truck or reel. Attention is particularly directed to the mechanism concerned in the cooperation of the switch arm 72, shaft 51, arm 53, limit switch 75, lock lever 59 and the chock or stop shelf 65, for it is thereby assured that the reel may be safely handled and contained on the truck during transportation without possibility of damage due to breakage in the cables, overrunning of the motor 40, etc.

Although the above description particularly has to do with the construction of an electrically operated truck and the handling of telephone reels, it is believed to be obvious that the invention is susceptible of different and varied uses and should therefore be limited not by the details described, but only by the scope of the appended claims.

What is claimed is:

1. In an industrial truck, a platform for supporting an object, means for engaging the object to advance it onto the platform, and a tiltable chock on the platform normally in one position to facilitate movement of the object relative to the platform and operable by the object when the object has reached a predetermined position to engage the rear of the object and thereby maintain the object on the platform.

2. In an apparatus for handling cylindrical objects, an industrial truck, a platform for supporting the object, means for engaging the object to roll it onto the platform, and a tiltable chock normally in one position to facilitate movement of the object relative to the truck and operable by the object when the object has reached a predetermined position to engage the rear of the object and thereby hold the object on the truck.

3. In a reel handling truck, a tiltable platform for receiving and supporting the reel, means for moving the reel with respect to the platform along a predetermined path, means interposed in the path of the reel and in the rear thereof for retaining the reel in a predetermined position in its path, and means positioned behind the retaining means and engaged by the reel to render effective the retaining means and simultaneously to render ineffective the reel moving means.

4. In a safety device for industrial trucks, a pivoted retaining member movable to operative and inoperative positions, a pivoted arm connected thereto and having a hook portion and a latch member for engaging the hook portion for holding the retaining member in operative position.

5. In an industrial truck, a pivoted latch member, a switch for controlling the latch member, a pivoted hook member controlled by an object being trucked to engage the latch member, and a pivoted object retaining member movable into operative position by the hook member and movable to inoperative position by the switch.

6. In a reel handling truck, a titltable platform for receiving and supporting the reel, a power hoist for moving the reel with respect to the platform along a predetermined path, and means interposed in the path of the reel and actuated thereby for cutting off the hoist power, applying a brake to the hoist, and retaining the reel in a predetermined position in its path.

7. In a reel handling truck, a platform for receiving and supporting a reel, means for moving the reel forwardly along the platform, forwardly and rearwardly disposed members supported on the platform, means interconnecting the members for moving them in unison to engage the reel periphery at spaced points and means for retaining the members against movement when the reel reaches a predetermined position.

8. In a reel handling truck, a platform for receiving and supporting a reel, means for moving the reel in a predetermined path along the platform, a movable reel retaining member supported by the platform and normally ineffective, a movable operating member supported by the platform in advance of the retaining member and engageable by the reel in the movement thereof, and a member interconnecting the retaining and operating members for rendering effective the retaining member upon a predetermined movement of the operating member by the reel.

In witness whereof, I hereunto subscribe my name this 27th day of February, 1931.

TILFORD H. BEAN.